June 30, 1953  D. P. WEBER  2,643,405

SHOEMAKING MACHINE

Filed Aug. 24, 1949

INVENTOR.
DONALD P. WEBER
BY
Schmieding, Hittson and Gerler
Attorneys.

Patented June 30, 1953

2,643,405

UNITED STATES PATENT OFFICE 2,643,405

SHOEMAKING MACHINE

Donald P. Weber, Columbus, Ohio, assignor to
The H. C. Godman Company, Columbus, Ohio,
a corporation of Ohio Application August 24, 1949, Serial No. 112,055

3 Claims. (Cl. 12—1)

The present invention relates to shoe machines and particularly to a machine for trimming the sole edge cover at the bottom surface of the sole.

In the manufacture of rubber crepe soled shoes, it is desirable to cover the edge of the sole with a rubber crepe material. In the covering of the edge of the sole, the crepe covering strip is somewhat wider than the thickness of the sole and extends beyond the bottom surface of the sole. It is then necessary to cut off the excess of the strip of crepe material.

The present invention embodies a machine including a rotatable knife in which the opposite surfaces of the knife are disposed at an angle to one another to form a knife edge. A mechanism in the form of a guide for the edge of the sole is provided with a shear portion which overlaps the knife edge to form with the knife edge a shear. This mechanism is also provided with a guide surrface which is disposed at substantially a right angle to the one surface of the knife so that when the edge of the sole is held flush to the guide surface, a cut will be made across the overlapping portion of the crepe strip parallel with and aligned with the bottom of the sole. More specifically, the present invention embodies, in combination with the rotatable knife, a roller having an undercut. One surface of the undercut cooperates with one surface of the knife to form a shear and a peripheral surface of the roller is disposed at substantially a right angle to the opposite surface of the knife and forms a guide for the edge of the sole.

Further objects and advantages of the present invention will be apparent from the following description, reference being had to the accompanying drawings wherein a preferred form of embodiment of the invention is clearly shown.

Figure 1:
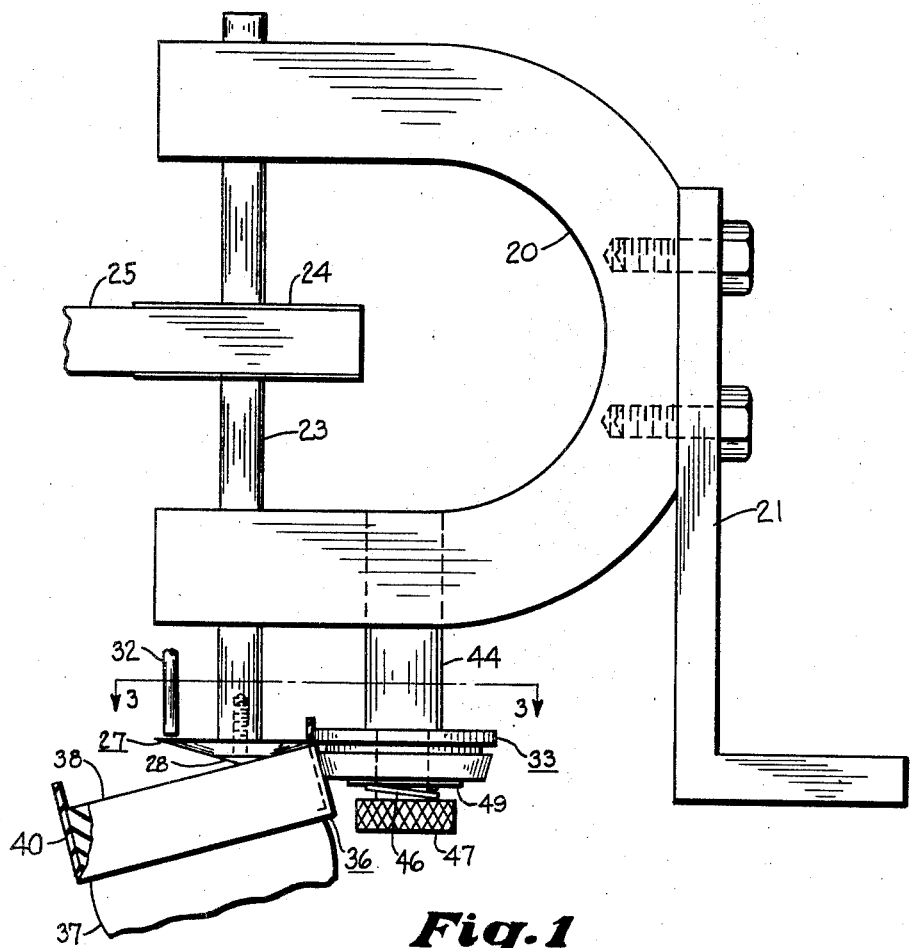
Fig. 1 is a side view of the improved shoe making machine showing a shoe being trimmed, part of the sole of the shoe being broken away to show the edge cover strip more in detail.
Figure 2:
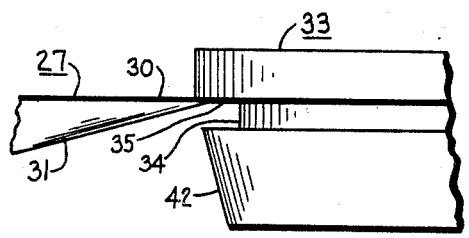
Fig. 2 is a view, on a larger scale, showing details of the shear and the guide.
Figure 3:
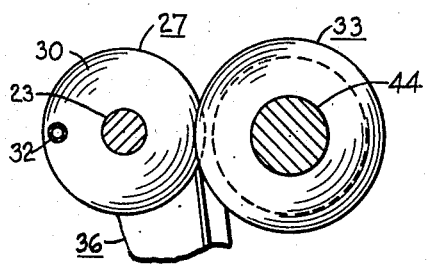
Fig. 3 is a sectional view taken on line 3—3 of Fig. 1.

Referring to the drawings, there is shown a main frame 20 which is carried by a bracket 21. The frame is C-shaped in cross section and by suitable bearings carries a spindle 23 which is driven by a pulley 24 which in turn is driven by a belt 25. Below the frame 20, the spindle 23 carries a knife 27 which is held in place by a screw 28. The knife is in the form of a disc having an upper surface 30 and a lower surface 31 arranged at an angle with respect to one another at approximately 15°. The knife 27 forms one element of a shear. Water is dripped onto the surface of the knife 27 through a tube 32.

The other element which forms, with the knife 27, a shear comprises a shear block 33 having an undercut in the surface which confronts the edge of the knife and receives the edge of the knife. One of the surfaces 35 forming the undercut is juxtaposed to the overlapping portion of the edge of the knife and forms the shearing surface which cooperates with the knife.

The shoe 36 having the upper 37 and the rubber crepe sole 38 is shown substantially upside down and in trimming position. The edge cover which surrounds the entire periphery of the sole is shown at 40. The shear is arranged to trim the overlapping portion of the cover 40 parallel with and aligned with the bottom of the sole when brought in contact with the shearing surfaces of the knife and the shear block.

The shear block 33 also functions as a guide for positioning the edge of the sole with respect to the knife. The guide surface is indicated at 42 and is disposed at substantially a right angle with respect to the under surface 31 of the knife 27. When the bottom of the sole is laid flush with the bottom surface 31 of the knife and the edge of the shoe brought flush with the guide surface 42 of the shear block 33, the overhanging portion of the cover strip will be severed parallel with the bottom surface of the sole. Water dripping from the tube 32 onto the knife 27 will wet the surface of the knife, at the cutting edge, and also the surface of the rubber crepe cover to enhance the cutting.

If desirable, the shear block 33 may be in the form of a roller which is rotatably mounted on an axle 44 which depends from the lower side of the frame 20. The undercut 34 in the roller is in the form of a circumferential groove. When the edge of the sole of the shoe is pressed against the guide surface 42 and the shoe is moved along the knife for trimming the sole cover, the roller type shear block will rotate. Some workmen do not desire a freely turning roll but desire that a dragging tension be applied to the rolling action. In order to provide this dragging tension, a spring 46 is interposed between the head of the screw 47 which holds the roller in place and the bottom of the roller and the tension may be adjusted by adjusting the tension of the spring 46. Preferably a washer 49 is disposed between the spring and the roller.

By virtue of the present invention, with very little training, any workman may operate the machine satisfactorily and perform a neat trimming operation. Furthermore, the cost of sharpening the knife is materially reduced because the shearing action provides substantially the same effect whether the knife is dull or sharp.

While the form of embodiment of the present invention as herein disclosed constitutes a preferred form, it is to be understood that other forms might be adopted, all coming within the scope of the claims which follow:

I claim:

1. A shoe machine for trimming the sole edge cover of a shoe at the bottom surface of the sole comprising, a circularly shaped rotatable knife having opposite surfaces disposed at an angle to one another to form a knife edge, the bottom surface being conical throughout the length thereof and forming a guide for the sole of the shoe; mechanism having an undercut portion for receiving the edge of the knife, one surface of the undercut of the mechanism cooperating with one surface of the knife to form a shear, said mechanism including a rotatable portion having a peripheral surface disposed at substantially a right angle to the bottom side surface of the knife and forming a guide for the edge of the sole; and a shaft extending upwardly from the knife and attached to the latter for driving the rotatable knife.

2. A shoe machine for trimming the sole edge cover of a shoe at the bottom surface of the sole comprising, a circularly shaped rotatable knife having opposite surfaces disposed at an angle to one another to form a knife edge, the bottom surface being conical throughout the length thereof and forming a guide for the sole of the shoe; a roller having an undercut portion for receiving the edge of the knife, one surface of the undercut of the roller cooperating with one surface of the knife to form a shear, said roller having a peripheral surface disposed at substantially a right angle to the bottom side surface of the knife and forming a guide for the edge of the sole; and a shaft extending upwardly from the knife and attached to the latter for driving the rotatable knife.

3. A shoe machine for trimming the sole edge cover of a shoe at the bottom surface of the sole comprising, a circularly shaped rotatable knife having opposite surfaces disposed at an angle to one another to form a knife edge, the bottom surface being conical throughout the length thereof and forming a guide for the sole of the shoe; a freely rotatable roller having an undercut portion for receiving the edge of the knife, one surface of the undercut of the roller cooperating with one surface of the knife to form a shear, said roller having a peripheral surface disposed at substantially a right angle to the bottom side surface of the knife and forming a guide for the edge of the sole; a shaft extending upwardly from the knife and attached to the latter for driving the rotatable knife; tension drag means for the roller; and means for adjusting the tension of the drag means.

DONALD P. WEBER.

References Cited in the file of this patent

UNITED STATES PATENTS

| Number | Name | Date |
|---|---|---|
| 492,991 | Perkins | Mar. 7, 1893 |
| 1,148,762 | Engel | Aug. 3, 1915 |
| 1,268,477 | Lerch et al. | June 4, 1918 |
| 1,659,597 | Fowler | Feb. 21, 1928 |
| 1,783,869 | Allen | Dec. 2, 1930 |
| 1,986,870 | West | Jan. 8, 1935 |
| 2,013,851 | Merrill | Sept. 10, 1935 |
| 2,055,483 | Engel | Sept. 29, 1936 |
| 2,125,931 | Lancaster | Aug. 9, 1938 |
| 2,173,176 | Matheu | Sept. 19, 1939 |